United States Patent [19]

Rudy et al.

[11] 4,236,277
[45] Dec. 2, 1980

[54] CRUSTACEAN SHELLING APPARATUS

[75] Inventors: Norman A. Rudy, Bellingham; Lloyd C. Fredrickson, Lindon, both of Wash.

[73] Assignee: Amfac Foods, Inc., Portland, Oreg.

[21] Appl. No.: 38,459

[22] Filed: May 14, 1979

[51] Int. Cl.$^3$ ............................................. A22C 29/02
[52] U.S. Cl. ...................................................... 17/73
[58] Field of Search ............................. 17/71, 73, 74

[56] References Cited

U.S. PATENT DOCUMENTS

| | | | |
|---|---|---|---|
| 2,660,754 | 12/1953 | Roshko | 17/73 |
| 3,203,039 | 8/1965 | Glidden et al. | 17/71 X |
| 4,004,321 | 1/1977 | Harrison | 17/71 X |
| 4,121,322 | 10/1978 | Rutledge | 17/73 |

Primary Examiner—Willie G. Abercrombie
Attorney, Agent, or Firm—Christensen, O'Connor, Johnson & Kindness

[57] ABSTRACT

A crustacean shelling apparatus includes a cupped wheel feed assembly positioned transversely adjacent and centered on a pair of counterrotating vertically mounted squeeze rollers. The cupped wheel feed assembly includes a plurality of outwardly opening cups spaced circumferentially around the outer rim of the wheel assembly. Crustacean body parts are manually placed into the cups as they rotate through an upwardly opening position near the top of the wheel assembly, wherefrom they are carried to a position immediately adjacent the nip of the counterrotating rollers. A pressurized water feed mechanism positioned slidably abutting the inside surface of the outer rim of the feed wheel assembly thereupon comes into registry with an aperture at the bottom of each cup as the cup approaches the rollers and drives the crustacean body parts into the nip of the rollers by means of a stream of water. The crustacean body part is separated into a meat portion and a shell portion upon being grasped in the nip of the counterrotating rollers. The meat portion falls directly into a meat chute without passing through the rollers. The separated shell portion passes through the rollers and falls into a shell chute.

12 Claims, 7 Drawing Figures

CRUSTACEAN SHELLING APPARATUS

BACKGROUND OF THE INVENTION

This invention relates generally to shelling devices and, more particularly, to crustacean shelling devices.

The present invention represents an improvement over various roller type devices heretofore available for removing meat from crabs and other crustaceans. Such devices have been the product of efforts to develop machines to replace the tedious and time consuming manual processing of crustacean meat. For the most part, the devices heretofore available have proven relatively inefficient, unreliable, and, in some cases, dangerous. In view of the high and rising prices commanded for crab meat and other crustacean food products, even relatively small improvements in the performance of processing machines have been actively and continuously sought. Accordingly, it is the object of the present invention to provide a more efficient and reliable crustacean processing device.

Mechanized devices for processing precooked crustacean body parts have employed various configurations of horizontally mounted squeeze rollers. The principle of operation of these rollers is basically similar to that of the present invention. As crustacean body parts are grasped in the nip of the rollers, the simultaneous shearing and squeezing action of the rollers squeezes the meat portion out of the shell, whereupon the meat falls free and the shell portion is pulled through the rollers. A problem common to the prior art devices employing horizontally mounted rollers is that the crustacean meat is hindered from falling free by the presence of the lower roller. A jet of water or other means must be used to wash the crustacean meat free of the roller and into a meat collection chute. Nevertheless, the meat occasionally hangs up momentarily on the surface of the lower roller and is pulled through the nip of the rollers and lost. This results in inefficiency and economic loss.

One solution to the above mentioned problem is to use vertically mounted rollers wherein the separated crustacean meat may fall freely downward in front of the rollers, without contacting either roller, immediately upon being separated from the crustacean shell. Such a solution has not been practically implemented heretofore because it poses particularly difficult problems in feeding the crustacean body parts into the roller. In particular, vertically mounted rollers are not amenable to the use of conveyor belt feed systems generally used in the industry. Manually inserting crustacean body portions into the rollers is highly dangerous, and mechanical feed devices for vertically mounted rollers have not been heretofore available.

Accordingly, it is also an object of the present invention to provide a crustacean processing apparatus employing vertically mounted counterrotating rollers and having a safe and efficient feeding mechanism to insert crustacean body parts into the nip thereof.

DESCRIPTION OF THE PREFERRED EMBODIMENT

Figure 1:
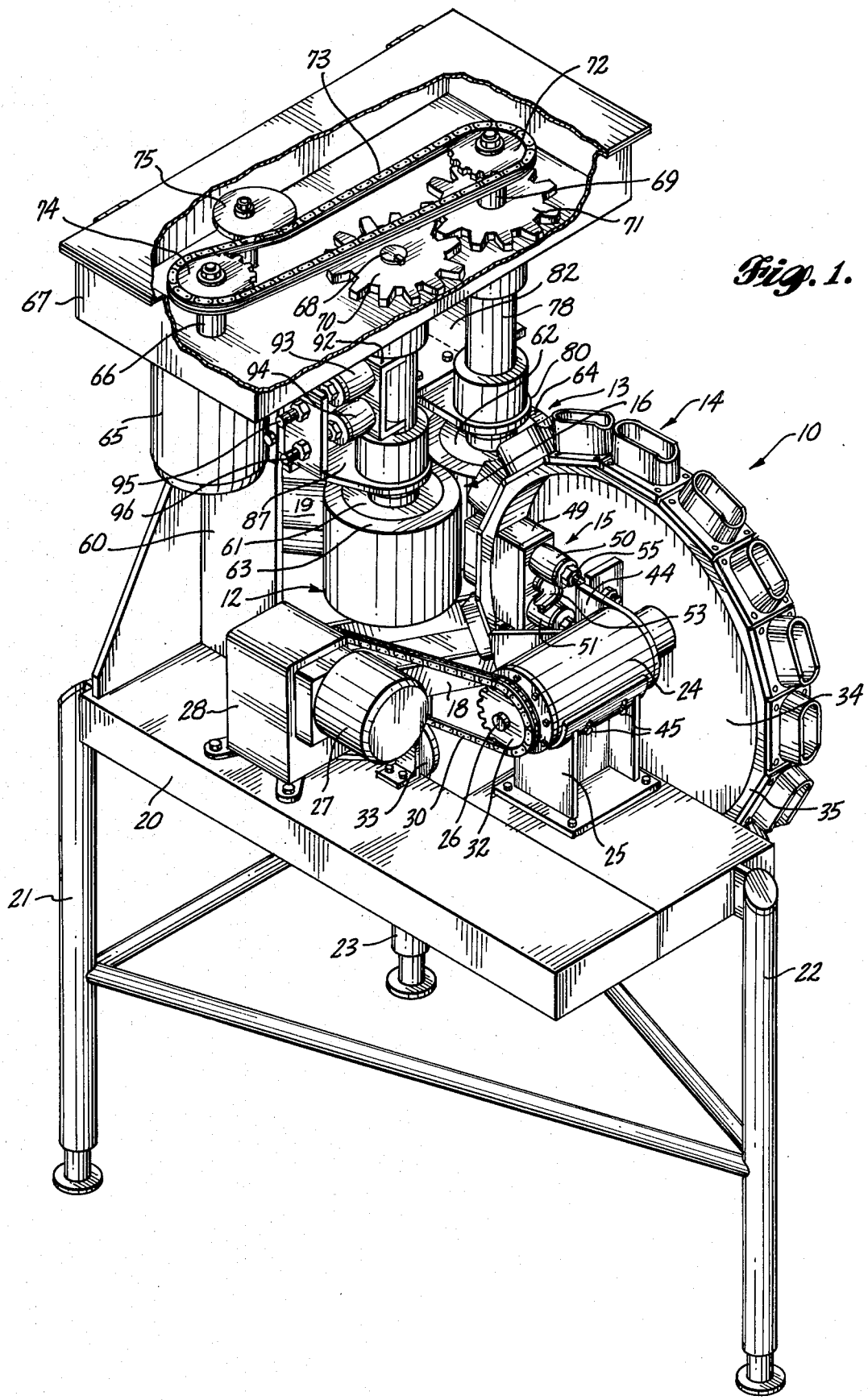
FIG. 1 is an isometric view of the preferred embodiment of the crustacean processing apparatus of the present invention.
Figure 2:
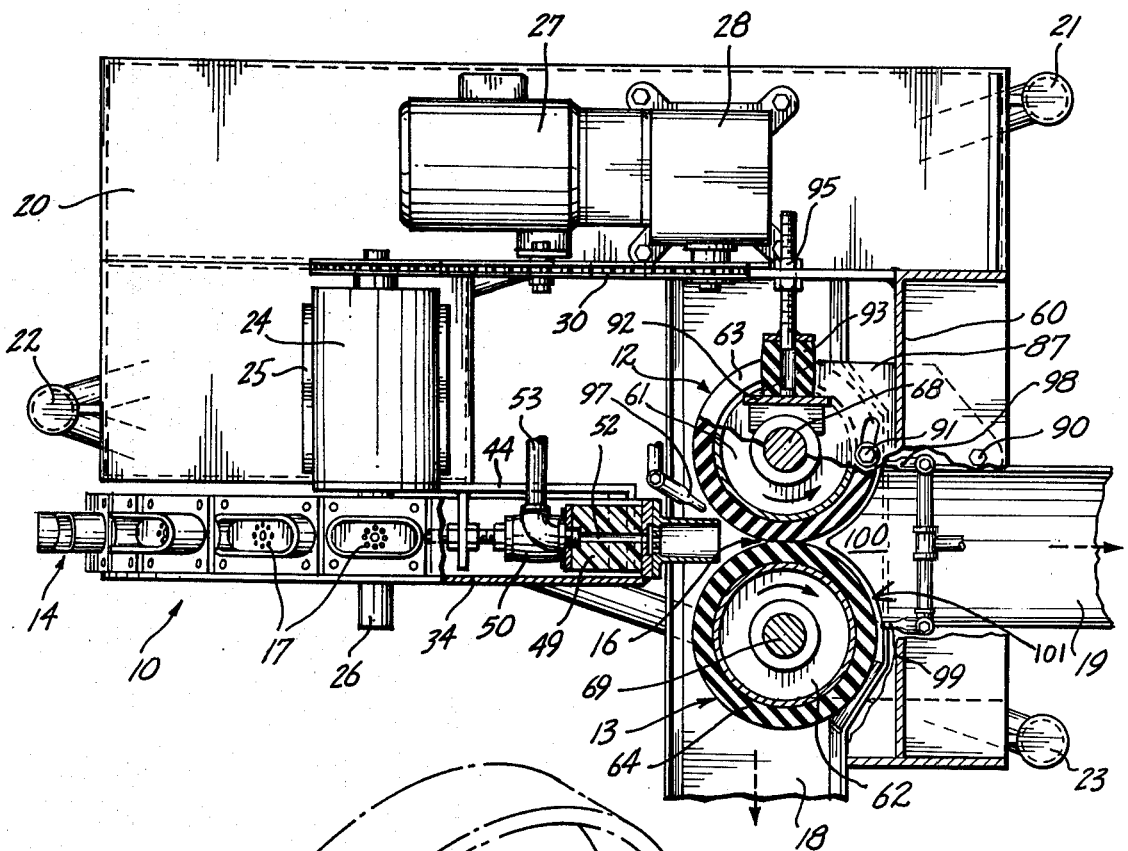
FIG. 2 is a plan view in partial cross-section of the apparatus.

Referring to FIGS. 1, 2, 4 and 6, the preferred embodiment of the crustacean shelling apparatus includes generally a rotating cupped wheel 10 which carries precooked crustacean body parts 11 to a pair of counterrotating rollers 12 and 13. The body parts 11 are carried in cups 14 which open radially outwardly from the outer surface of the cupped wheel 10. In practice, the body parts 11 are manually placed in the cups 14 as they pass through an upwardly opening position near the top of the wheel 10. As the crustacean body parts 11 are thereafter carried downwardly into a position adjacent the counterrotating rollers 12 and 13, a pressurized water feed mechanism 15 pushes the body parts 11 into the nip 16 of the rollers 12 and 13 by means of a high-pressure stream of water projected radially outwardly through nozzles 17 in the bottom of each cup 14. The crustacean body parts 11 are thereupon grasped and squeezed in the nip 16 of the rollers 12 and 13, whereupon the meat portion of the crustacean body part 11 is separated from the shell portion. The meat portion is squeezed out of the shell portion and drops directly onto a meat chute 18 without passing through the rollers 12 and 13. The shell portion passes through the rollers 12 and 13 and falls onto a shell chute 19.

Figure 3:
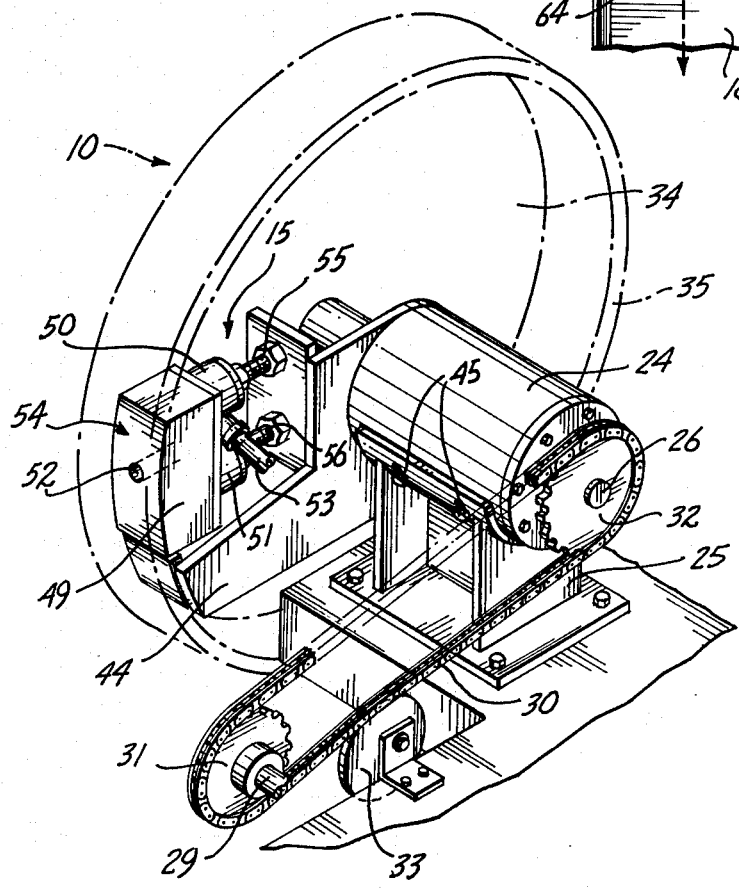
FIG. 3 is an isometric view showing details of the cupped wheel assembly and the pressurized water feed mechanism.
Figure 4:
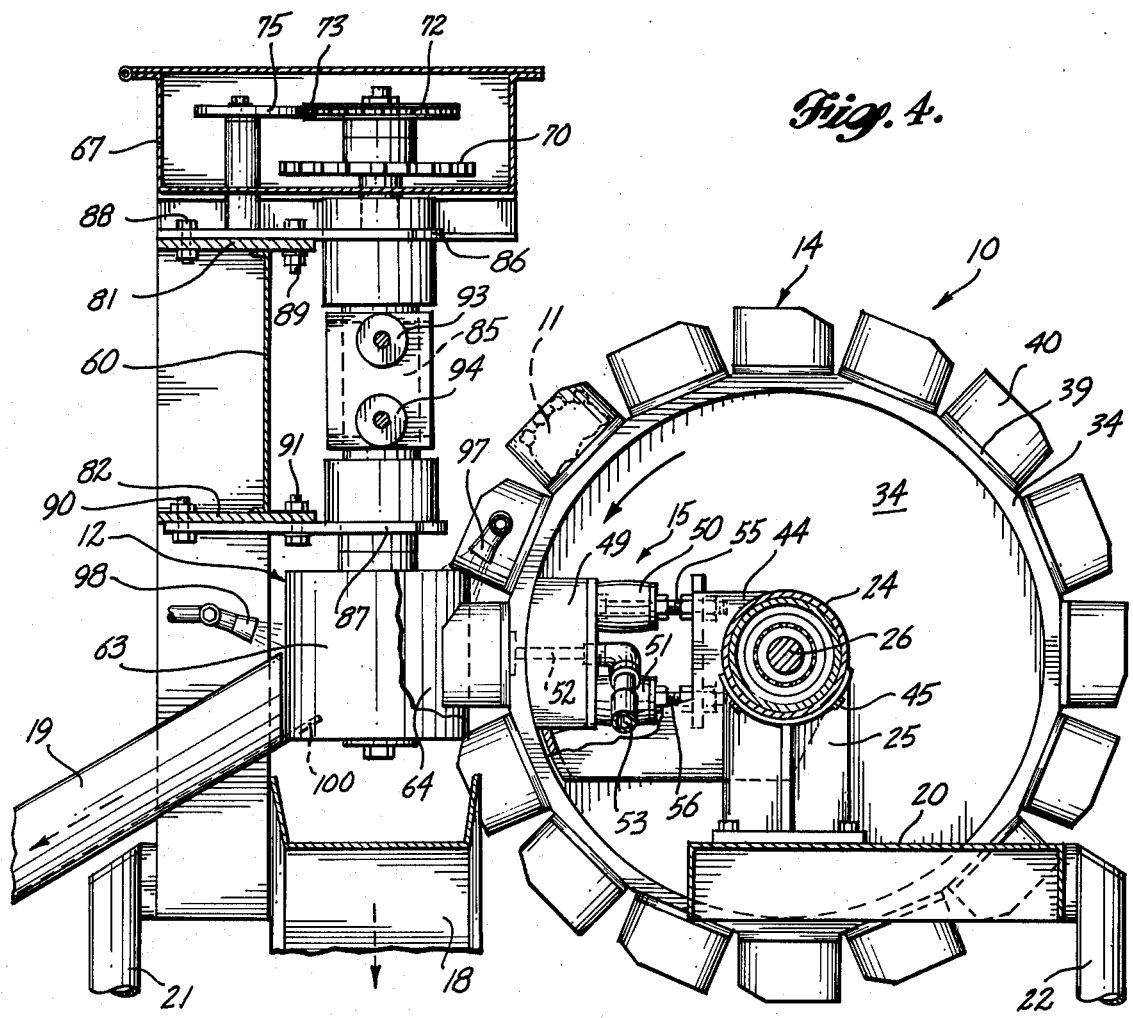
FIG. 4 is a side view in partial cross-section of the apparatus taken along line 4—4 of FIG. 6.

The apparatus is mounted on a table 20 which stands on three legs 21, 22 and 23. Referring in particular to FIGS. 1 and 3, the cupped wheel 10 is mounted on the table 20 by means of a cylindrical bearing housing 24 and a cooperable bearing housing cradle 25 bolted to the table 20. The bearing housing cradle 25 is selectively positionable on the table 20 to adjust the distance between the cupped wheel 10 and the rollers 12 and 13.

The cupped wheel 10 turns on an axle shaft 26 which extends through the bearing housing 24. The cupped wheel 10 is driven by a one-half horse power, 725 nominal r.p.m. electric motor 27. The output shaft of the electric motor 27 is coupled to a gear reduction box 28. The output shaft 29 of the gear reduction box 28 is coupled to the shaft 26 of the cupped wheel 10 by means of a drive chain 30 and sprockets 31 and 32. A tensioning eccentric 33 maintains the drive chain 30 under adequate tension. During operation, the output shaft 29 of the gear box 28 turns at a speed of approximately 4.7 r.p.m. to turn the cupped wheel 10 at a preferred operating speed of approximately 4.5 r.p.m. Other operating speeds may be employed to accommodate variations in crustacean body shapes and sizes by installing different sprockets on the gear box 28 and the shaft 26 of the cupped wheel 10.

Figure 5:
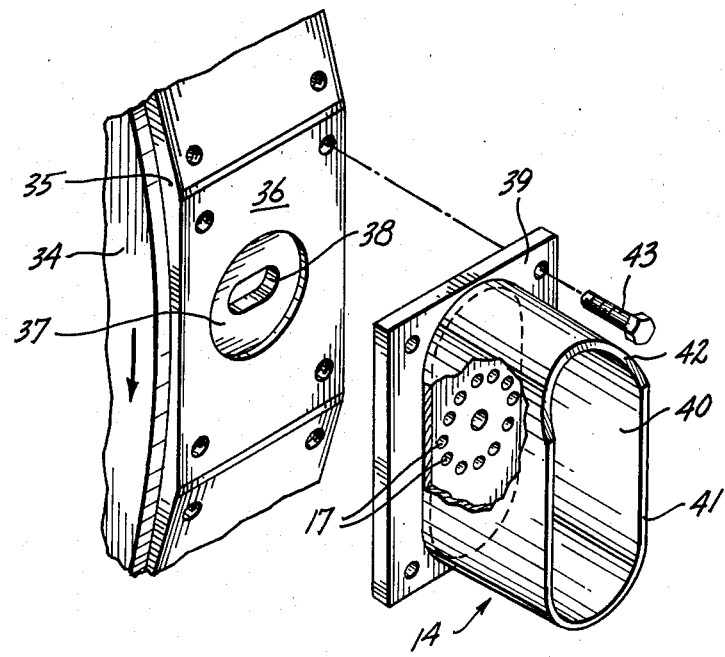
FIG. 5 is an isometric view showing details of the wheel and one cup.
Figure 6:
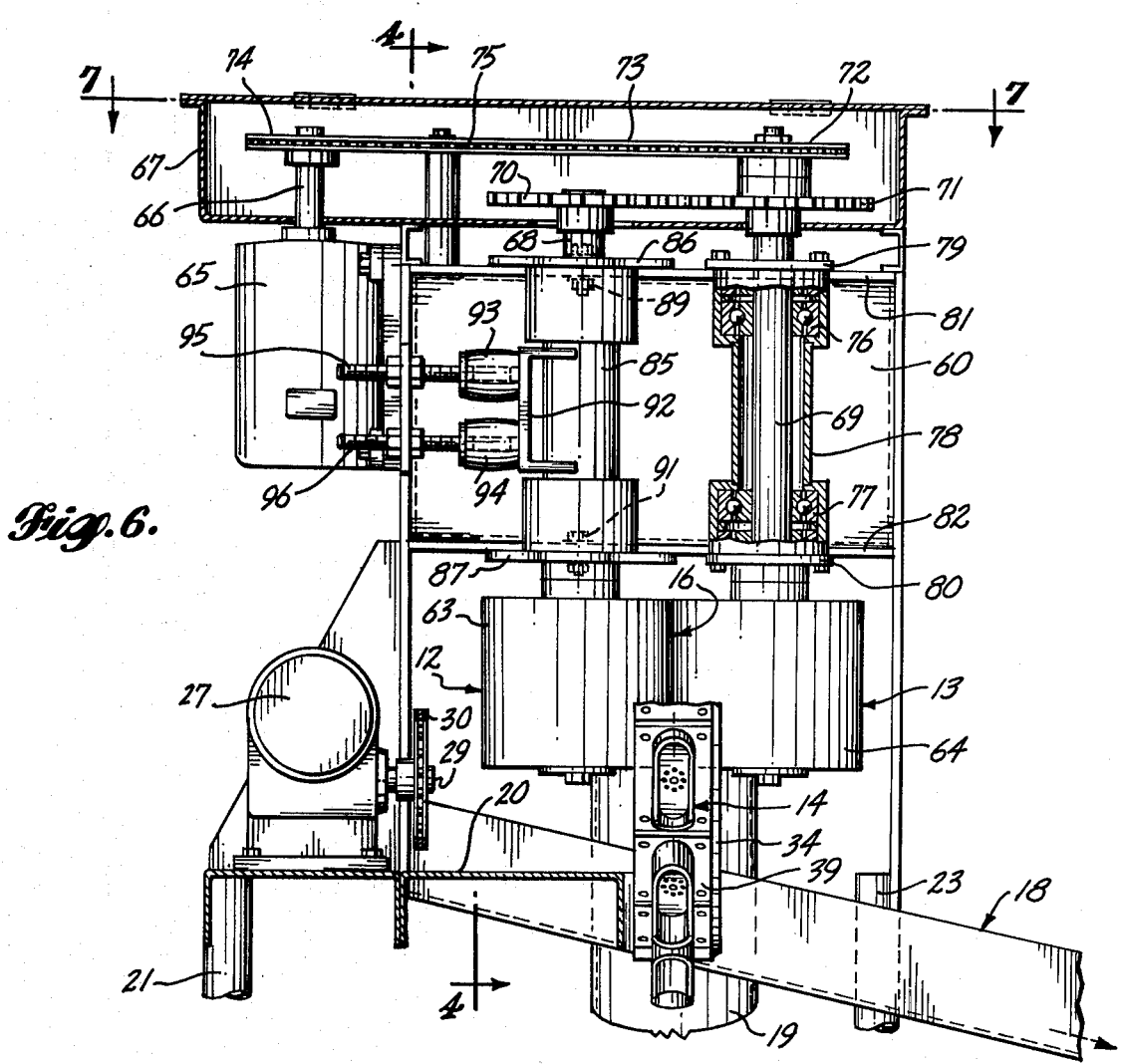
FIG. 6 is an end view in partial cross-section of the apparatus.

Referring to FIGS. 3 and 5, the cupped wheel 10 includes a circular wheel plate 34 which is secured at its center to the end of the axle shaft 26. A faceted outer rim 35 is secured to the peripheral edge of the wheel plate 34. The outer surface of the rim 35 is composed of adjacent flat tangential facets 36. Each facet 36 is rectangularly shaped and includes a central circular recess 37. At the center of each recess 37 is an oblong hole 38 which passes through the rim 35 and through which water may be injected from the pressurized water feed mechanism 15.

Each cup 14 is formed from a single piece of cast aluminum and includes a flat bottom plate 39 and an oblong cup wall 40 projecting perpendicularly therefrom. The outer edge 41 of the cup wall 40 is parallel to the bottom plate 39, except for an indented trailing edge portion 42 which is inclined at an angle of approximately 30 degrees with respect to the plane of the outer edge 41 of the cup wall 40. This indented trailing edge portion 42 prevents the cup wall 40 from prematurely dragging a body part 11 down and out of the nip 16 of the rollers 12 and 13 after it has been pushed out of the cup 14 but before complete separation of meat from shell has occurred.

Each cup 14 is secured to a facet 36 of the rim 35 by four bolts 43 which pass through the bottom plate 39. The nozzles 17 are generally centrally located in the bottom plate 39 such that they are centered on the recess 37 in the rim 35. The recess 37 functions as a buffer volume wherein water entering under high pressure through the oblong hole 38 is distributed to the nozzles 17.

The pressurized water feed mechanism 15 is mounted inside the outer rim 35 of the cupped wheel 10 by means of a pivotable bracket 44. The bracket 44 is fixedly secured to one end of the cylindrical bearing housing 24 and may be pivoted about the axis of axle shaft 26 by rotating the bearing housing 24 in its cradle 25. Four set screws 45 secure the bearing housing 24 to its cradle 25 and enable the bearing housing 24 to be rotated over a limited angular range and fixed at any position therein, thereby enabling adjustment of the angle of the water feed mechanism 15 with respect to the rollers 12 and 13.

The water feed mechanism 15 further includes a polyethylene plastic pressure block 49 mounted to the bracket 44 and urged radially outward therefrom with respect to the cupped wheel 10 by means of adjustable rubber springs 50 and 51. The polyethylene block 49 includes a water supply bore 52 passing therethrough which is fed by a water hose 53. The water bore 52 opens onto a cylindrically curved surface 54 which slidably abuts the cylindrical inside surface of the outer rim 35. As the cupped wheel 10 turns, each hole 38 in the outer rim 35 sequentially rotates into registry with the water bore 52, whereupon water is injected from the water bore 52 through the hole 38 and radially outward into the cup 14 via the nozzles 17. The position with respect to the rollers 12 and 13 at which each hole 38 and its associated cup 14 rotates into registry with the water bore 52 can be adjusted by using the set screws 45 to adjust the angle of the bracket 44 as described above. This effectively permits adjustment of the timing of the water stream to attain optimum performance of the feed mechanism 15 in driving the crustacean body parts 11 into the nip 16 of the rollers 12 and 13.

In practice, it is found that water at a pressure of approximately 60 p.s.i. provides a satisfactory supply of water to drive the crustacean body parts 11 out of the cup 14 and into the nip 16 of the rollers 12 and 13. The pressurized water also serves to lubricate the curved surface 54 of the polyethylene block 49 against the rotating inside surface of the outer rim 35. The rubber springs 50 and 51 operate to maintain the polyethylene block 49 pressed firmly against the inside surface of the circular rim 35 to thereby minimize water leakage. The force exerted by the rubber springs 50 and 51 is variable by means of nut and bolt assemblies 55 and 56, and may be adjusted to provide the least amount of water leakage commensurate with an acceptable level of drag on the wheel 10.

Referring to FIGS. 2, 4, 6 and 7, the counterrotating rollers 12 and 13 are mounted suspended in parallel vertical orientations from an upright frame 60 at the opposite end of the table 20 from the cupped wheel 10. The rollers 12 and 13 consist of cylindrical drums 61 and 62 clad with layers of rubber 63 and 64, respectively, each having a thickness of approximately 1.5 to 2.0 inches. The rubber has a hardness between 35 and 80 on the Durometer hardness scale, and is preferably between 55 and 60.

A one-half horsepower variable speed electric motor 65 mounted on the side of the frame 60 drives the rollers 12 and 13. The output shaft 66 of electric motor 65 extends upwardly into a gear box 67 which is shown in plan view in FIG. 7. The rollers 12 and 13 rotate on roller axle shafts 68 and 69, respectively, which also extend upwardly into the gear box 63. The roller shafts 68 and 69 are coupled at their upper ends by long-toothed, loose fitting gears 70 and 71, respectively. Roller shaft 69 is further equipped with a sprocket 72 at its upper end by which it is coupled to the output shaft 66 of electric motor 65 by means of a drive chain 73 and a sprocket 74 secured to the upper end of the output shaft 66. The tension of the drive chain 73 is maintained by a tensioning eccentric 75. In practice, the rollers 12 and 13 are driven at a preferred rotational speed of approximately 50 r.p.m., corresponding to a motor shaft output speed of approximately 37 r.p.m.

The shaft 69 of roller 13 rotates in two ball bearing assemblies 76 and 77 which are encased in a bearing housing 78. The bearing housing 78 is secured at its upper and lower ends to upper and lower horizontal support plates 79 and 80 which extend from upper and lower horizontal frame plates 81 and 82, respectively. The positions of the roller 13 and its associated axle shaft 69 are thus rigidly fixed with respect to the frame 60.

The axle shaft 68 of squeeze roller 12 likewise rotates in two ball bearing assemblies (not shown) encased in a bearing housing 85. The bearing housing 85 is mounted at its ends to upper and lower pivotable bracket plates 86 and 87, respectively. The upper bracket plate 86 is pivotably attached to the upper frame plate 81 by means of a fixed pivot bolt 88 and a sliding guide bolt 89. The lower bracket plate 87 is likewise pivotably attached to the lower horizontal frame plate 82 by means of a second fixed pivot bolt 90 and a second sliding guide bolt 91. The bracket plates 86 and 87 swing laterally about the pivot bolts 88 and 90 and thereby allow the shaft 68 of roller 12 to also swing about the coaxial axes of the pivot bolts 88 and 90.

A flat vertical plate 92 is attached to one side of bearing housing 85. Two rubber springs 93 and 94 are mounted to the frame 60 so as to push laterally on the vertical plate 92 and thereby maintain roller 12 firmly urged against roller 13 with a predetermined amount of force. The force of compression exerted on the rollers 12 and 13 by the springs 93 and 94 is adjustable by means of nut and bolt assemblies 95 and 96 by which the rubber springs 93 and 94 are attached to the frame 60. The compression of the rollers 12 and 13 must be set high enough to ensure adequate crushing of the crustacean body parts 11 and their separation into meat and shell, and yet cannot be set so high as to result in binding of the rollers 12 and 13 by occasional large pieces of shell caught in the nip 16. The rubber springs 93 and 94 also operate to ensure continuous operation as the rubber layers 63 and 64 on the rollers 12 and 13 deteriorate over long periods of time and thereby cause roller 12 to swing slightly closer to roller 13.

Figure 7:
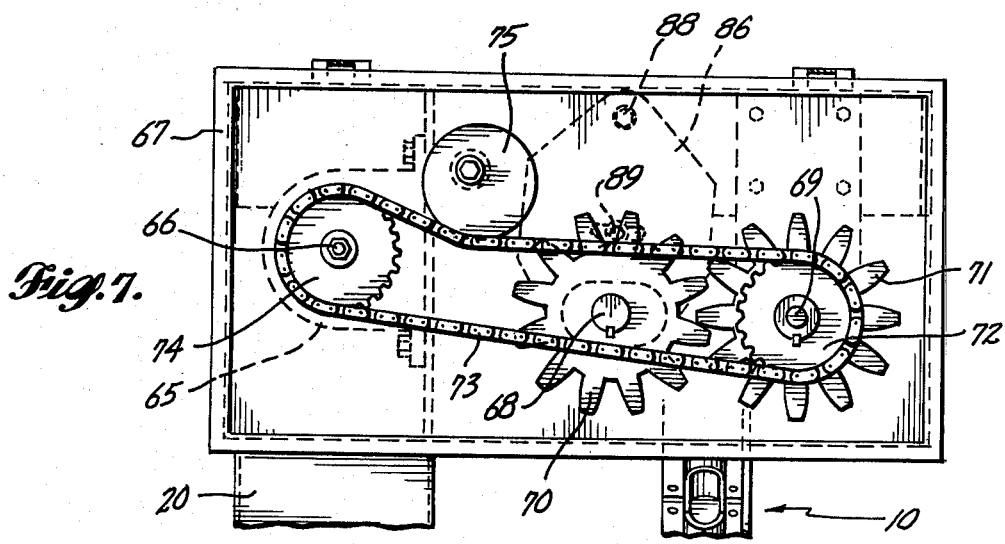
FIG. 7 is a plan view taken along line 7—7 of FIG. 6 of the gear box at the top of the apparatus.

Referring to FIG. 7, it will be noted that the drive gears 70 and 71 are long-toothed and loosely meshed to permit lateral movement of roller 12 and its drive gear 70 without impairing the operation of the apparatus. During normal operation, the roller 12 and its shaft 68 can repeatedly and intermittently flex laterally against the rubber springs 93 and 94 as the rollers 12 and 13 are continuously driven at approximately 50 r.p.m. Moreover, the long-toothed drive gears 70 and 71 accommodate wear and deterioration of the rubber layers 63 and 64 over long periods of time by permitting the rollers 12 and 13 to gradually move closer to one another.

Water jets 97, 98 and 99 continuously wash down the surfaces of the rotating rollers 12 and 13. The front water jet 97 is directed downwardly at an angle of approximately five degrees from vertical towards the front of the nip 16 to wash the separated meat portions of the body part 11 directly downward into the underlying meat chute 18. The rear water jets 97 and 98 are positioned behind the rollers to wash adhered meat material off the back surfaces of the rollers 12 and 13 and into the meat chute 18. This adhered meat material consists of relatively finely divided meat material which passes through the nip 16 of the rollers 12 and 13 and may be washed downwardly into the meat chute 18. It is noted that the meat chute 18 underlies both the front and back sides of the rollers 12 and 13 so as to collect both the large meat portions falling from the front of the nip 16 as well as the adhered meat material washed off the back of the rollers 12 and 13. The shell chute 19 slopes downwardly from contoured upper end portion 100 at the base of the back of the rollers 12 and 13. A gap 101 between the back surfaces of the rollers 12 and 13 and the edge of the contoured upper end portion 100 of the shell chute 19 allows the finely divided adhered meat material to be washed downwardly off the back of the rollers 12 and 13 to the underlying meat chute 18. This gap 101 is typically $\frac{3}{8}$ inch to $\frac{5}{8}$ inch in width. In practice, it is found that the crushed shell portion of the crustacean body part 11 generally consists of large pieces of shell which remain adhered together after crushing and which are carried by their own momentum over the gap 101 and onto the shell chute 19 upon emerging from the rollers 12 and 13. Thus, relatively little shell material falls through to the meat chute 18 through the gap 101 between the back of the rollers 12 and 13 and the edge of the shell chute 19.

During operation, an operator stands in front of the cupped wheel 10 and places crustacean body parts 11 into the cups 14 as they pass through an upwardly open position near the top of the wheel 10. The crustacean body parts 11 are then carried to a position adjacent the nip 16 of the rollers 12 and 13, whereupon the water feed mechanism 15 comes into registry and drives the body parts 11 into the nip 16 with a stream of water. The overall operation is particularly safe because the operator's hands never approach the otherwise dangerous counterrotating rollers 12 and 13.

When crabs are being processed, it is found that approximately fifty percent of the meat in each crab body portion is removed from the shell and drops into the meat chute. This meat is sold commercially as "chunk" crab meat. The remaining mixture of meat and shell, generally referred to above as the shell portion, passes through the nip 16 and falls into the shell chute 19. The meat in this mixture is further separated from the shell by a subsequent centrifuge process, not shown. The meat separated by the centrifuge process is sold as "shred" crab meat.

Although a preferred embodiment of the present invention is described and illustrated herein, it is understood that various alterations, modifications, and substitutions may be made by one skilled in the art without departing from the scope or spirit of the present invention. Accordingly, the scope of the invention is intended to be limited only by the following claims.

The embodiments of the invention in which an exclusive property or privilege is claimed are defined as follows:

1. A crustacean processing apparatus for separating the meat portion of a crustacean body part from the shell portion thereof, comprising:
   first and second counterrotatable rollers having upright axes of rotation substantially parallel to one another; support means to which said rollers are mounted; roller drive means for driving said rollers in counterrotating directions, said rollers being contiguously positioned adjacent one another to thereby form a nip between said rollers wherein a crustacean body part may be grasped and separated into a meat portion and a shell portion;
   a cupped wheel assembly for conveying crustacean body parts to a position centered on and immediately adjacent said nip of said rollers, said wheel assembly including a substantially circular wheel means and a plurality of cups attached thereto and opening radially outwardly therefrom, said wheel means having a substantially horizontal axis of rotation and being centered on said nip of said rollers; wheel assembly drive means operable to rotate said wheel means about its axis, and;
   a pressurized water feed means for pushing said crustacean body parts radially outwardly from said cups and into said nip upon said cups being rotated to a position adjacent said nip.

2. The apparatus of claim 1 wherein said cups of said cupped wheel assembly each include a floor portion and a wall portion, said floor portion having an aperture therethrough; wherein said pressurized water feed means operates to project a stream of water through said aperture of said floor portion of each said cup upon said cup rotating into a position adjacent said nip and to thereby drive said crustacean body portion radially outwardly from said cup and into said nip of said rollers.

3. The apparatus of claim 2 wherein said cupped wheel assembly includes a wheel rim secured to the outer periphery of said wheel means, said wheel rim having a substantially cylindrical interior surface and an outer surface from which said cups open radially outwardly, said rim including a plurality of holes passing radially therethrough and aligned respectively with said apertures in said floor portions of said cups; wherein said water feed means includes: a pressure block positioned adjacent said cylindrical interior surface and having a water bore passing therethrough, said pressure block having a cylindrically curved peripheral face cooperably slidably abutted against said cylindrical interior surface of said wheel rim, said water bore opening onto said curved peripheral face and thereby being registerable with said holes in said rim as said wheel means rotates about its axis; and, means for maintaining said pressure block firmly urged against said interior surface of said rim.

4. The apparatus of claim 3 wherein said rollers include: a first roller and a second roller, said rollers each including a layer of elastomer material on their outer cylindrical peripheral surface, said first roller having an axle shaft mounted in bearing assemblies fixedly secured to said mounting means, said second roller having an axle shaft mounted in bearing assemblies swingable about an upright pivot axis to thereby enable said second roller to swing arcuately away from said first roller; and, means for maintaining said second roller flexibly urged against said first roller.

5. The apparatus of claim 4 wherein said wheel means comprises a circular wheel plate, said wheel rim being secured along one edge thereof to the outer peripheral edge of said wheel plate, said wheel rim including a plurality of tangential facets on the outer surface thereof to which said bottom portions of said cups are respectively secured, said holes through said wheel rim opening onto said facets and being respectively aligned with said apertures in said floor portions of said cups.

6. The apparatus of claim 5 wherein said pressure block of said water feed means is rotatable about said axis of rotation of said wheel plate to thereby enable adjustment of the position with respect to said nip of said rollers at which said water bore comes into registry with said holes of said wheel rim.

7. The apparatus of claim 6 wherein said pressure block is formed of polyethylene.

8. The apparatus of claim 7 wherein each of said cups includes an outer edge and an indented trailing edge portion thereof.

9. The apparatus of claim 8 further comprising a meat chute positioned under said rollers for collecting meat material falling downwardly therefrom; and a shell chute positioned behind said rollers for collecting shell material passing through said rollers.

10. The apparatus of claim 9 wherein said shell chute includes a contoured upper end portion positioned adjacent the lower ends of said rollers and spaced from said rollers by a gap through which adhered meat material may pass.

11. The apparatus of claim 10 further comprising water jets directed at said rollers for washing meat material downwardly off said rollers into said meat chute.

12. The apparatus of claim 11 wherein said roller drive means includes a pair of long-toothed, loosely meshed gears coupling said axle shafts of said rollers so as to accommodate lateral movement of said second roller with respect to said first roller without impairing the operation of said drive means.

* * * * *